United States Patent
Takubo et al.

(10) Patent No.: US 10,934,316 B2
(45) Date of Patent: Mar. 2, 2021

(54) PROCESS FOR PRODUCING SILYL PHOSPHINE COMPOUND AND SILYL PHOSPHINE COMPOUND

(71) Applicant: Nippon Chemical Industrial Co., Ltd., Tokyo (JP)

(72) Inventors: Yosuke Takubo, Tokyo (JP); Ken Tamura, Tokyo (JP)

(73) Assignee: NIPPON CHEMICAL INDUSTRIAL CO., LTD., Tokyo (JP)

( * ) Notice: Subject to any disclaimer, the term of this patent is extended or adjusted under 35 U.S.C. 154(b) by 0 days.

(21) Appl. No.: 16/332,176

(22) PCT Filed: Sep. 19, 2017

(86) PCT No.: PCT/JP2017/033724
§ 371 (c)(1),
(2) Date: Mar. 11, 2019

(87) PCT Pub. No.: WO2018/061869
PCT Pub. Date: Apr. 5, 2018

(65) Prior Publication Data
US 2019/0263845 A1    Aug. 29, 2019

(30) Foreign Application Priority Data
Sep. 29, 2016   (JP) .............................. JP2016-191858

(51) Int. Cl.
C07F 9/62    (2006.01)
C07F 9/06    (2006.01)

(52) U.S. Cl.
CPC .................................. C07F 9/062 (2013.01)

(58) Field of Classification Search
None
See application file for complete search history.

(56) References Cited

U.S. PATENT DOCUMENTS 2,907,785 A    10/1959  Parshall et al.
2017/0226138 A1 *  8/2017  Shin ........................ C07F 9/062

FOREIGN PATENT DOCUMENTS

| DE | 274 626 A1 | 12/1989 | | |
|---|---|---|---|---|
| FR | 2986527 A1 | 8/2013 | | |
| JP | 2002-313746 A | 10/2002 | | |
| KR | 10-2016-0059327 A | 5/2016 | | |
| WO | 2013/114311 A1 | 8/2013 | | |
| WO | WO2013114311 A1 * | 8/2013 | | |
| WO | WO-2013114311 A1 * | 8/2013 | ............... | C07F 9/06 |
| WO | WO2016080683 A1 * | 1/2016 | | |

OTHER PUBLICATIONS

ISA Written Opinion PCT/JP2017/033724 dated Sep. 19, 2017 (Year: 2017).*
International Search Report dated Oct. 24, 2017, issued in counterpart International Application No. PCT/JP2017/033724 (2 pages).
Uhlig et al., "Eine neue Methode zur Darstellung von Organosilylphosphiene", Z. anorg. allg. Chem., (1989), 576, pp. 281-283, with English Translation. (3 pages).
Bruckmann et al., "Tris (n-butyl) phosphine, Tris (tert-Butyl) phosphine and Tris (trimethylsilyl) phosphine", Acta Crystallographica Section C, (1995), C51, pp. 1152-1155, with English Translation. (4 pages).
Parshall et al., "Synthesis of Alkylsilylphosphines", J. Am. Chem. Soc., (1959), vol. 81, pp. 6273-6275. with English Translation. (3 pages).
Driess et al., "P (SiiPr3) 3: the First Trisilylphosphane Derivative with an almost Planar Three-Coordinated Phosphorus Atom", Z. Anorg. Allg. Chem., (2000), 626, pp. 2264-2268, with English Translation. (6 pages).
Extended European Search Report dated Jul. 19, 2019, issued in European Patent Application No. 17855824.3 (PCT/JP2017033724).

* cited by examiner

Primary Examiner — Alexander R Pagano
Assistant Examiner — Kofi Adzamli
(74) Attorney, Agent, or Firm — Westerman, Hattori, Daniels & Adrian, LLP

(57) ABSTRACT

The process for producing a silyl phosphine compound of the present invention comprises a first step of mixing a solvent having a relative dielectric constant of not more than 4, a basic compound, a silylating agent and phosphine to obtain a solution containing a silyl phosphine compound, a second step of removing the solvent from the solution containing a silyl phosphine compound to obtain a concentrated solution of a silyl phosphine compound, and a third step of distilling the concentrated solution of a silyl phosphine compound to obtain the silyl phosphine compound. The silyl phosphine compound of the present invention is a silyl phosphine compound represented by the following general formula (1), wherein a content of a compound represented by the following general formula (2) is not more than 0.5 mol %. (For explanatory notes of the formulas, see the specification.)

9 Claims, 2 Drawing Sheets

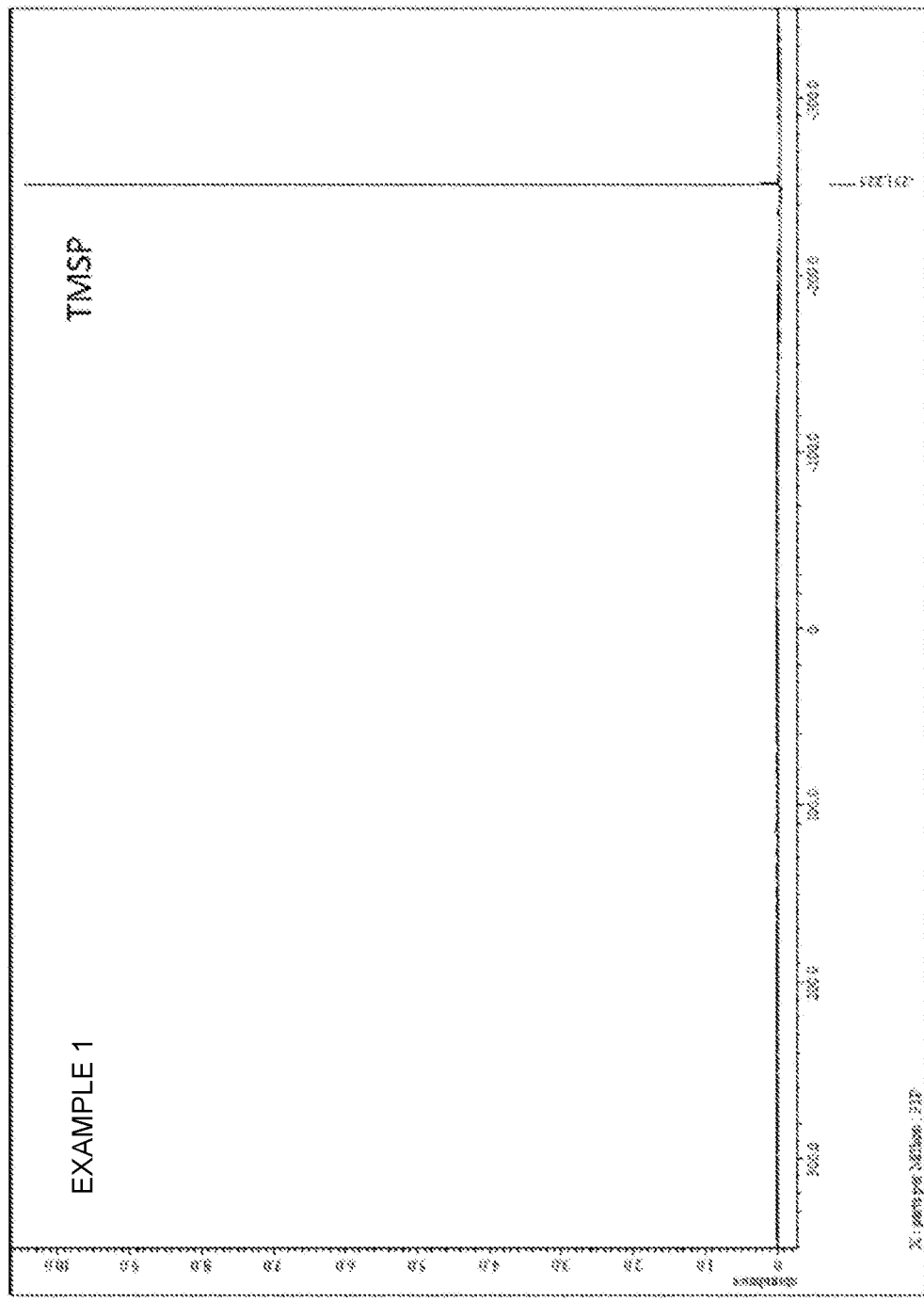

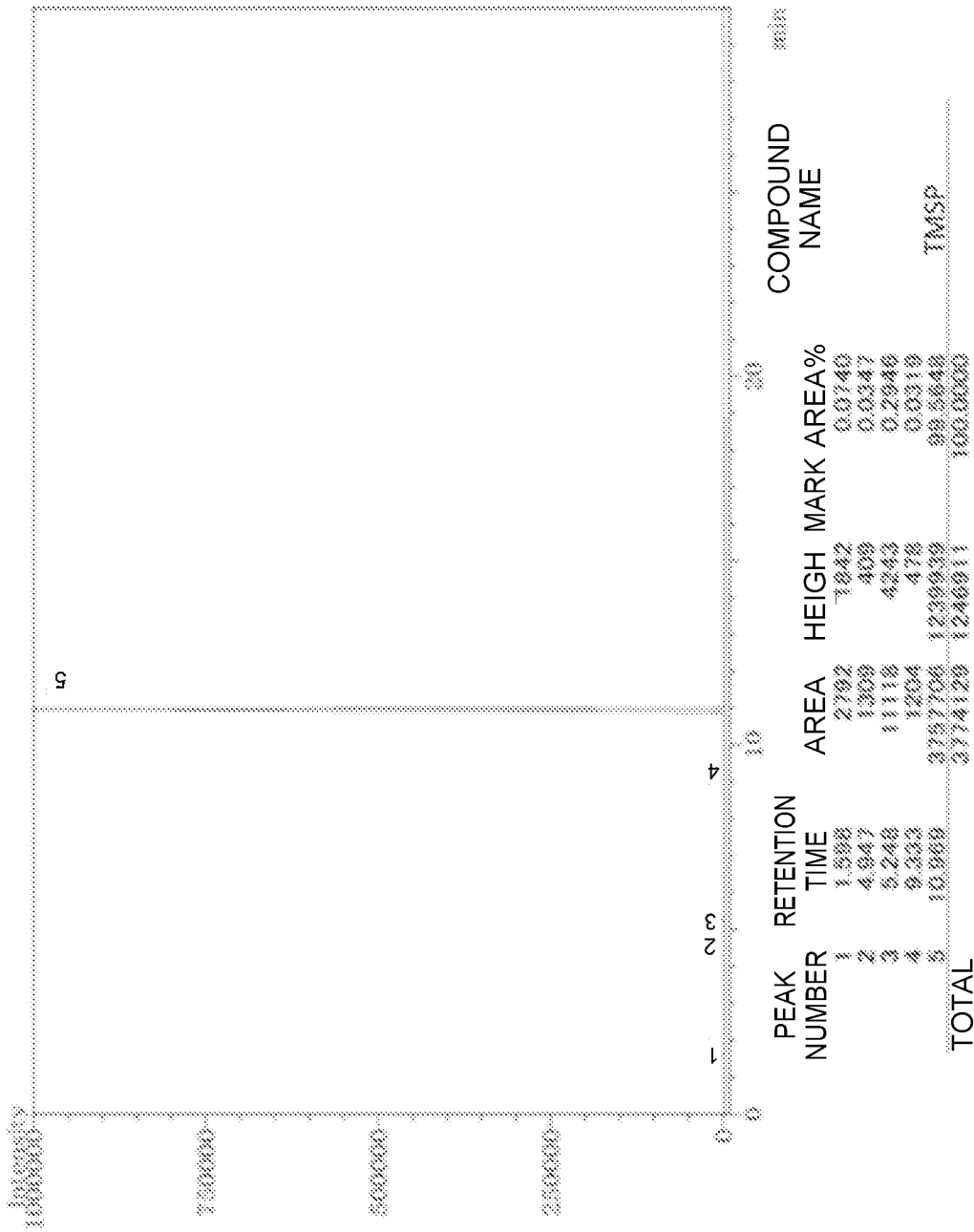
[Figure 2]

PROCESS FOR PRODUCING SILYL PHOSPHINE COMPOUND AND SILYL PHOSPHINE COMPOUND

TECHNICAL FIELD

The present invention relates to a process for producing a silyl phosphine compound that is useful as a phosphorus component raw material of indium phosphide quantum dots.

BACKGROUND ART

In recent years, development of quantum dots as luminescent materials has been under way. Development of cadmium-based quantum dots such as CdSe, CdTe and CdS that are typical quantum dots has been promoted from their excellent optical properties, etc. However, since toxicity and environmental burden of cadmium are high, development of cadmium-free quantum dots is being expected.

One of the cadmium-free quantum dots is, for example, indium phosphide (InP). In the production of indium phosphide, a silyl phosphine compound such as tris(trimethylsilyl)phosphine is often used as a phosphorus component raw material. Since the silyl phosphine compound such as tris(trimethylsilyl)phosphine can be used in a solid state or in a state of a liquid phase in which the compound is dissolved in a solvent, it is also used as a phosphorus source of organic synthesis in circumstances where a gaseous phosphorus source (phosphine or the like) cannot be used. As production processes for a silyl phosphine compound such as tris(trimethylsilyl)phosphine, a few processes have been proposed (e.g., Patent Literature 1 and Non Patent Literatures 1 to 3).

Of the production processes for a silyl phosphine compound, the production processes using phosphine, a silylating agent such as trimethylsilyl triflate and a basic compound, which are described in Patent Literature 1 and Non Patent Literature 1, are thought to be particularly useful for carrying out industrial production from the viewpoints of reaction rate, purity of the product, etc. In these Patent Literature 1 and Non Patent Literature 1, ethers are used as solvents for use in the reaction.

CITATION LIST

Patent Literature

Patent Literature 1: German Patent Laid-Open No. 274626

Non Patent Literature

Non Patent Literature 1: Z. anorg. Allg. Chem. 576 (1989) 281-283
Non Patent Literature 2: Acta Crystallographica Section C, (1995), C51, 1152-1155
Non Patent Literature 3: J. Am. Chem. Soc., 1959, 81 (23), 6273-6275

SUMMARY OF INVENTION

However, the production processes for a silyl phosphine compound described in Patent Literature 1 and Non Patent Literature 1 have problems in regard to purity and yield. In the process for obtaining a silyl phosphine compound by the reaction of phosphine, a silylating agent and a basic compound in the presence of a solvent, safety of the solvent that vaporizes when the reaction mixture is distilled has been considered to be a problem.

Accordingly, it is an object of the present invention to provide a process for producing a silyl phosphine compound in which the safety is high, the reaction rate can be improved, and a silyl phosphine compound of high purity is obtained.

In order to solve the above problem, the present inventors have earnestly studied, and as a result, they have found that by using a reaction solvent having a particular dielectric constant, not only is the safety of the production enhanced but also the reaction rate can be improved and a silyl phosphine compound of high purity is obtained, and they have achieved the present invention.

That is to say, the present invention provides a process for producing a silyl phosphine compound, comprising: a first step of mixing a solvent having a relative dielectric constant of not more than 4, a basic compound, a silylating agent and phosphine to obtain a solution containing a silyl phosphine compound; a second step of removing the solvent from the solution containing a silyl phosphine compound to obtain a concentrated solution of a silyl phosphine compound; and a third step of distilling the concentrated solution of a silyl phosphine compound to obtain a silyl phosphine compound.

In addition, the present invention provides a silyl phosphine compound represented by the following general formula (1), wherein a content of a compound represented by the following general formula (2) is not more than 0.5 mol %,

[Formula 1]

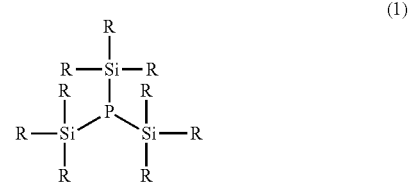

(1)

wherein each R is independently an alkyl group having not less than 1 and not more than 5 carbon atoms or an aryl group having not less than 6 and not more than 10 carbon atoms,

[Formula 2]

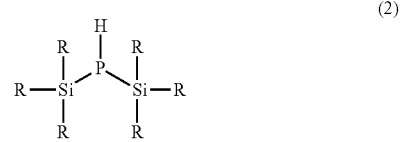

(2)

wherein R is the same as in the general formula (1).

BRIEF DESCRIPTION OF DRAWINGS

FIG. 1 is a $^{31}$P-NMR spectrum of a recovered substance obtained in Example 1.

FIG. 2 is a gas chromatography spectrum of a recovered substance obtained in Example 1.

DESCRIPTION OF EMBODIMENTS

A preferred embodiment of the production process of the present invention and a preferred embodiment of a silyl phosphine compound are described hereinafter. A silyl phosphine compound that is a desired product in this production process is a tertiary compound, namely a compound in which three silyl groups are bonded to a phosphorus atom, and is preferably a compound represented by the following general formula (1).

[Formula 3]

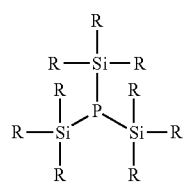
(1)

wherein each R is independently an alkyl group having not less than 1 and not more than 5 carbon atoms or an aryl group having not less than 6 and not more than 10 carbon atoms.

Examples of the alkyl groups having not less than 1 and not more than 5 carbon atoms, the alkyl groups each being represented by R, include methyl group, ethyl group, n-propyl group, isopropyl group, n-butyl group, sec-butyl group, tert-butyl group, isobutyl group, n-amyl group, isoamyl group and tert-amyl group.

Examples of the aryl groups having not less than 6 and not more than 10 carbon atoms, the aryl groups each being represented by R, include phenyl group, tolyl group, ethylphenyl group, propylphenyl group, isopropylphenyl group, butylphenyl group, sec-butylphenyl group, tert-butylphenyl group, isobutylphenyl group, methylethylphenyl group and trimethylphenyl group.

These alkyl groups and aryl groups may each have one or two or more substituents, and examples of the substituents of the alkyl groups include hydroxyl group, halogen atoms, cyano group and amino group, and examples of the substituents of the aryl groups include alkyl groups having not less than 1 and not more than 5 carbon atoms, alkoxy groups having not less than 1 and not more than 5 carbon atoms, hydroxyl group, halogen atoms, cyano group and amino group. When the aryl group is substituted by an alkyl group or an alkoxy group, the number of carbon atoms of the alkyl group or the alkoxy group is included in the number of carbon atoms of the aryl group.

A plurality of R in the general formula (1) may be the same as or different from one another (the same shall apply to each of the general formula (I) and the general formulas (2) to (7) described later). Furthermore, three silyl groups ($-SiR_3$) present in the general formula (1) may also be the same as or different from one another. As the silyl phosphine compound represented by the general formula (1), a compound wherein R is an alkyl group having not less than 1 and not more than 4 carbon atoms or a phenyl group that is unsubstituted or substituted by an alkyl group having not less than 1 and not more than 4 carbon atoms is preferable because it is excellent in reactivity with other molecules, as a phosphorus source in the synthesis reaction, and a trimethylsilyl group is particularly preferable.

This production process includes a first step, a second step and a third step. First, the first step is described.

(First Step)

In this step, a silylating agent, a basic compound, a solvent having a relative dielectric constant of not more than 4 and phosphine are mixed to obtain a solution containing a silyl phosphine compound. In particular, it is preferable to mix a mixed solution containing a silylating agent, a basic compound and a solvent having a relative dielectric constant of not more than 4 with phosphine to obtain a solution containing a silyl phosphine compound, from the viewpoints of ease of mixing of the components, workability and safety. Especially, it is more preferable to mix the mixed solution with phosphine to obtain a solution containing a silyl phosphine compound by introducing phosphine into the mixed solution.

The silylating agent is preferably, for example, a compound represented by the following general formula (I) from the viewpoint of reactivity with phosphine.

[Formula 4]

(I)

wherein R is the same as in the general formula (1), and X is at least one selected from a fluorosulfonic acid group, a fluoroalkanesulfonic acid group, an alkanesulfonic acid group and a perchloric acid group.

An example of the reaction of the present embodiment in the case where the silylating agent is a compound represented by the general formula (I) is shown as the following reaction formula.

[Formula 5]

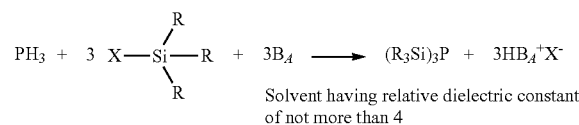

Solvent having relative dielectric constant of not more than 4 wherein R and X are the same as those in the general formula (I), and $B_A$ is a monovalent base.

The fluorosulfonic acid group represented by X is also represented by "$-OSO_2F$". The fluoroalkanesulfonic acid group represented by X is, for example, a perfluoroalkanesulfonic acid group. Examples thereof include a trifluoromethanesulfonic acid group ($-OSO_2CF_3$), a pentafluoroethanesulfonic acid group ($-OSO_2C_2F_5$), a heptafluoropropanesulfonic acid group ($-OSO_2C_3F_7$), a nonafluorobutanesulfonic acid group ($-OSO_2C_4F_9$) and an undecafluoropentanesulfonic acid group ($-OSO_2C_5F_{11}$). Examples of the alkanesulfonic acid groups represented by X include a methanesulfonic acid group ($-OSO_2CH_3$), an ethanesulfonic acid group ($-OSO_2C_2H_5$), a propanesulfonic acid group ($-OSO_2C_3H_7$), a butanesulfonic acid group ($-OSO_2C_4H_9$) and a pentanesulfonic acid group ($-OSO_2C_5H_{11}$). The perchloric acid group represented by X is also represented by "$-OClO_3$". In these formulas, "$-$" represents a bonding hand.

The silylating agent is preferably one in which R is an alkyl group having not less than 1 and not more than 5 carbon atoms or a phenyl group that is unsubstituted or substituted by an alkyl group having not less than 1 and not more than 5 carbon atoms, from the viewpoint of excellent reactivity. Alternatively, a silylating agent wherein X is a perfluoroalkanesulfonic acid group, particularly a trifluoromethanesulfonic acid group, is also preferable because it is excellent in leaving properties from the silyl group. From these viewpoints, it is preferable to particularly use, as the silylating agent, one or two or more selected from trimethylsilyl trifluoromethanesulfonate, triethylsilyl trifluoromethanesulfonate, tributylsilyl trifluoromethanesulfonate, triisopropylsilyl trifluoromethanesulfonate and triphenylsilyl trifluoromethanesulfonate.

In addition to use of a specific solvent described later, it is preferable that the amount of the silylating agent in the mixed solution be a specific amount from the viewpoint that formation of impurities, particularly secondary or primary silyl phosphine, is effectively suppressed. It is preferable that the ratio of the silylating agent to the phosphine introduced into the mixed solution be not less than the reaction equivalent, that is, not less than 3 times the molar amount of the phosphine, and it is more preferable that the ratio be more than 3 times, additionally not less than 3.01 times, particularly not less than 3.05 times, the molar amount of the phosphine. From the viewpoint that a residue of an excess silylating agent is reduced to enhance purity or the production cost is decreased, it is preferable that the amount of the silylating agent in the mixed solution be an amount of such a degree as is more than the reaction equivalent in the reaction with the phosphine but cannot be deemed to be excessive. From this viewpoint, the amount of the silylating agent in the mixed solution is preferably not more than 2 times the reaction equivalent based on the phosphine introduced into the mixed solution, that is, not more than 6 times, particularly preferably not more than 4 times, and most preferably not more than 3.5 times, the molar amount of the phosphine introduced into the mixed solution.

The secondary silyl phosphine that is an impurity is represented by, for example, the following general formula (2).

[Formula 6]

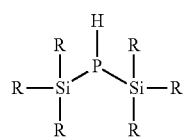

(2)

wherein R is the same as in the general formula (1).

The primary silyl phosphine that is an impurity is represented by, for example, the following general formula (3).

[Formula 7]

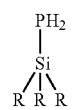

(3)

wherein R is the same as in the general formula (1).

The basic compounds include not only a base in a narrow sense that gives a hydroxide ion when it is dissolved in water but also a base in a broad sense such as a substance that receives a proton or a substance that gives an electron pair. It is preferable that the basic compounds be particularly amines because a side reaction with phosphine can be suppressed. Examples of the amines include primary, secondary or tertiary alkylamines; anilines; toluidine; piperidine; and pyridines. Examples of the primary, secondary or tertiary alkylamines include methylamine, dimethylamine, trimethylamine, ethylamine, diethylamine, triethylamine, propylamine, diisopropylamine, butylamine, isobutylamine, dibutylamine, tributylamine, pentylamine, dipentylamine, tripentylamine and 2-ethylhexylamine. Examples of the anilines include aniline, N-methylaniline, N,N-dimethylaniline and N,N-diethylaniline. Examples of the pyridines include pyridine and 2,6-di(t-butyl)pyridine. These can be used singly or in combinations of two or more.

It is preferable to use one or two or more selected particularly from methylamine, dimethylamine, trimethylamine, ethylamine, dimethylamine, triethylamine, ethylenediamine, aniline, toluidine, pyridine and piperidine among the above compounds because the reaction efficiently proceeds.

In addition to use of a specific solvent, it is preferable that the amount of the basic compound be a specific amount from the viewpoint that formation of impurities, particularly secondary or primary silyl phosphine, is effectively suppressed. For example, it is preferable that the ratio of the basic compound in the mixed solution to the phosphine introduced into the mixed solution be not less than the reaction equivalent, that is, when the basic compound is, for example, a monovalent base, it is preferable that the ratio be not less than 3 times the molar amount of the phosphine, and it is more preferable that the ratio be more than 3 times, additionally not less than 3.3 times, particularly not less than 3.5 times, the molar amount of the phosphine. From the viewpoint of enhancement in the purity of a desired product or decrease in the production cost, it is preferable that the amount of the basic compound in the mixed solution be a large amount of such a degree as does not become too excessive and preferably as cannot be deemed to be excessive. From this viewpoint, the amount of the basic compound in the mixed solution is preferably not more than 2 times the reaction equivalent based on the phosphine introduced into the mixed solution, and is preferably, for example, not more than 6 times, particularly preferably not more than 5 times, and most preferably not more than 4 times, the molar amount of the phosphine introduced into the mixed solution.

In the mixed solution, the number of moles of the basic compound is preferably not less than the number of moles of the silylating agent, and is preferably, for example, not less than 1.01 mol and not more than 2 mol, and more preferably not less than 1.05 mol and not more than 1.5 mol, per mol of the silylating agent.

The present inventor has earnestly studied a technique for enhancing a yield of a silyl phosphine compound and for obtaining a high purity in the process for producing a silyl phosphine compound in which a silylating agent, a basic compound and phosphine are allowed to react with one another. As a result, it is thought that one of the reasons why high purity and high yield have been conventionally difficult to obtain is that a hydrolyzate of a silyl phosphine compound that is a desired product is sometimes formed in the conventional production process. As a result of the earnest studies, it has been found that a solvent to be mixed with a silylating agent and a basic compound is important for the enhancement of purity and yield. As a result of further studies, it has been found that when a solvent having a relative dielectric constant of not more than a specific value is used, the yield of the desired silyl phosphine compound can be enhanced, and a high purity is obtained. Specifically, the solvent for use in the present invention has a relative dielectric constant of not more than 4.

The present inventor has thought that one of the reasons why the purity of the resulting silyl phosphine compound can be enhanced and the yield is enhanced by using a solvent having a relative dielectric constant of not more than 4 is that by using a solvent that is not easily dissolved in water, inclusion of water from an atmosphere is effectively prevented in the present invention. It is thought that owing to this, hydrolysis of a tertiary silyl phosphine compound is prevented, and formation of a hydrolyzate can be effectively suppressed. Examples of the hydrolyzates of the tertiary silyl phosphine compounds include the aforesaid compound represented by the general formula (2), the aforesaid compound represented by the general formula (3), and a compound represented by the following general formula (4).

[Formula 8]

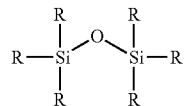

(4)

wherein R is the same as in the general formula (1).

Moreover, the present inventor has thought that it is another reason for the enhancement in yield and purity that by using a solvent having a relative dielectric constant of not more than 4, miscibility of the silylating agent, the basic compound and phosphine with one another increases. Improvement in miscibility enhances reaction efficiency to thereby raise the yield and suppresses formation of a by-product to thereby enhance the purity.

On the other hand, in the conventional production processes described in Non Patent Literature 1 and Patent Literature 1, an ether is used as a solvent, but ethers have relative dielectric constants of more than 4, as in the case of diethyl ether having a relative dielectric constant of 4.3 and cyclopentyl methyl ether having a relative dielectric constant of 4.8 (see Table 1 described later). When solvents having relative dielectric constants of more than 4 are used, high purity and high yield of a tertiary silyl phosphine compound are difficult to obtain, as shown in Comparative Examples 1 and 2 described later.

Furthermore, ethers have flammability or sometimes produce hydroperoxide that is an explosive substance, and hence, when the solvent is evaporated in the distillation step of the third step, temperature control or atmosphere control is difficult, and in particular, there is a problem of high risk because the silyl phosphine compound sometimes has spontaneous ignition properties. On the other hand, solvents having relative dielectric constants of more than 4 have such a risk of low level and are easy to manage.

The relative dielectric constant refers to a ratio of a dielectric constant of the substance to a dielectric constant of vacuum. In general, as the polarity of a solvent increases, the relative dielectric constant increases. As the relative dielectric constants of solvents in the present embodiment, values described in "Handbook of Chemistry: Pure Chemistry, 5th ed." (edited by the Chemical Society of Japan, published on Feb. 20, 2004, pp. 11-620-11-622) can be used.

The solvent having a relative dielectric constant of not more than 4 is usually an organic solvent and is preferably a hydrocarbon. Specific examples of the solvents having a relative dielectric constant of not more than 4 include acyclic or cyclic aliphatic hydrocarbon compounds and aromatic hydrocarbon compounds. The acyclic aliphatic hydrocarbon compounds are preferably those having not less than 5 and not more than 10 carbon atoms, and particularly preferred examples thereof include pentane (relative dielectric constant 1.8371), n-hexane (relative dielectric constant 1.8865), n-heptane (relative dielectric constant 1.9209), n-octane (relative dielectric constant 1.948), n-nonane (relative dielectric constant 1.9722) and n-decane (relative dielectric constant 1.9853). The cyclic aliphatic hydrocarbon compounds are preferably those having not less than 5 and not more than 8 carbon atoms, and particularly preferred examples thereof include cyclohexane (relative dielectric constant 2.0243) and cyclopentane (relative dielectric constant 1.9687). The aromatic hydrocarbon compounds are preferably those having not less than 6 and not more than 10 carbon atoms, and particularly preferred examples thereof include benzene (relative dielectric constant 2.2825), toluene (relative dielectric constant 2.379) and p-xylene (relative dielectric constant 2.2735).

The lower limit of the relative dielectric constant of the solvent having a relative dielectric constant of not more than 4 is preferably not less than 0.5 because the reaction due to the aforesaid reaction formula easily proceeds, and it is more preferably not less than 1. The upper limit thereof is more preferably not more than 3.5, and still more preferably not more than 3.

In order to easily remove the solvent from the desired product in the second step and the third step described later, the boiling point of the solvent having a relative dielectric constant of not more than 4 is preferably not higher than 200° C., and more preferably not lower than 40° C. and not higher than 120° C.

The process for preparing a mixed solution of the solvent, the basic compound and the silylating agent is not limited, and the three materials may be introduced into a reaction vessel at the same time, or after any one or two of them are introduced, the remainder may be introduced. It is preferable to mix the silylating agent and the basic compound with the solvent having been introduced in advance because the miscibility of the silylating agent with the basic compound is easily enhanced.

It is preferable to dehydrate the solvent before use because decomposition of a silyl phosphine compound due to reaction with water and formation of impurities caused by the decomposition are prevented. The water content in the solvent is preferably not more than 20 ppm by mass, and more preferably not more than 10 ppm by mass. The water content can be measured by the method described in the Examples described later. It is also preferable to deaerate the solvent to remove oxygen before use. The deaeration can be carried out by an arbitrary method such as replacement with an inert atmosphere in the reactor.

The amount of the solvent having a relative dielectric constant of not more than 4 is not limited, and is preferably, for example, not less than 100 parts by mass and not more than 300 parts by mass, particularly not less than 120 parts by mass and not more than 200 parts by mass, per 100 parts by mass of the silylating agent because the reaction proceeds efficiently.

Into the resulting mixed solution, phosphine is introduced. The phosphine is a gas represented by the molecular formula $PH_3$. The reaction system for the reaction of the silylating agent with the basic compound is preferably in an inert atmosphere because inclusion of oxygen is prevented, and formation of a compound represented by the following general formula (5) and a compound represented by the following general formula (6), which are the following oxides, due to the reaction of oxygen with the silyl phosphine compound is prevented. Examples of the inert gases include rare gases, such as nitrogen gas, helium gas and argon gas.

[Formula 9]

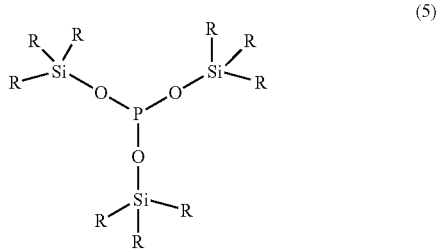

(5)

wherein R is the same as in the general formula (1).

[Formula 10]

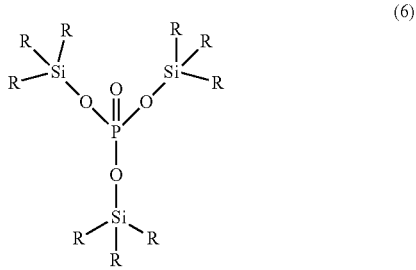

(6)

wherein R is the same as in the general formula (1).

When the phosphine is introduced, the liquid temperature of the mixed solution is preferably not lower than 20° C. from the viewpoint of enhancement in reaction rate and yield, and is preferably not higher than 85° C. from the viewpoint of prevention of decomposition of the desired product. From these viewpoints, the liquid temperature of the mixed solution is more preferably not lower than 25° C. and not higher than 70° C.

It is preferable to subject the resulting solution to aging before the solution is subjected to solvent removal in the second step. This aging is preferably carried out at a temperature of not lower than 20° C. and not higher than 60° C., and more preferably at a temperature of not lower than 20° C. and not higher than 50° C., from the viewpoint of enhancement in reaction rate and yield. The time for aging is preferably not shorter than 1 hour and not longer than 48 hours, and more preferably not shorter than 2 hours and not longer than 24 hours. This aging is preferably carried out in an inert atmosphere.

Through the above first step, a solution containing a silyl phosphine compound is obtained.

Further, a second step of removing (separating) at least a part of the solvent from the solution containing a silyl phosphine compound to obtain a concentrated solution of a silyl phosphine compound is carried out. By removing the solvent through concentration in the second step before distillation as described above, the amount of the solvent distillated away in the third step described later is reduced, so that a decrease in the yield of the silyl phosphine compound accompanying the solvent distillation during the distillation can be prevented, and thermal alteration or decomposition of the silyl phosphine compound that is a desired product can be prevented.

After the first step, preferably after the aforesaid aging treatment, a treatment to remove a salt $HB_A^+X^-$ that is a by-product is preferably carried out prior to the second step.

Specifically, by allowing the solution containing a silyl phosphine compound obtained in the first step (preferably the step including the aforesaid aging treatment) to stand still, a layer containing a silyl phosphine compound and a layer containing $HB_A^+X^-$ are separated from each other, and the latter is removed by liquid separation, whereby $HB_A^+X^-$ can be removed. The time for standing is preferably not shorter than 0.5 hours and not longer than 48 hours, and more preferably not shorter than 1 hour and not longer than 24 hours. The liquid separation is preferably carried out in an inert atmosphere.

(Second Step)

The technique to remove the solvent in the second step is, for example, a technique of heating the solution containing a silyl phosphine compound under reduced pressure and under the condition that the desired silyl phosphine compound almost remains, to evaporate the solvent. This treatment can be carried out by an arbitrary distillator for removing a solvent, such as a rotary evaporator. When the solution containing a silyl phosphine compound is heated under reduced pressure in the second step, the maximum liquid temperature is preferably not lower than 20° C. and not higher than 140° C., and more preferably not lower than 25° C. and not higher than 90° C., from the viewpoint of efficient solvent removal and the viewpoint of prevention of decomposition or alteration of the silyl phosphine compound. From the same viewpoints, the pressure (minimum pressure) at the time of reduced pressure is preferably not less than 2 kPa and not more than 20 kPa, and more preferably not less than 5 kPa and not more than 10 kPa, in terms of absolute pressure. The concentration is preferably carried out in an inert atmosphere.

After the second step, the amount of the silyl phosphine compound in the solution containing a silyl phosphine compound is preferably not more than 5 mass %, and more preferably not more than 1 mass %, in terms of a decrease ratio to the amount of a silyl phosphine compound in the solution at the beginning of the second step. This amount can be measured by $^{31}P$-NMR. The mass of the concentrated solution obtained in the second step is preferably not less than 10% of the mass of the solution containing a silyl phosphine compound obtained in the first step from the viewpoint of enhancement in yield, and is preferably not more than 50% from the viewpoint that the amount of the solvent remaining in the next third step is reduced to thereby enhance purity.

(Third Step)

Subsequently, a third step of distilling the concentrated solution obtained in the second step is carried out. The conditions for the distillation are conditions under which the silyl phosphine compound vaporizes, and from the viewpoint of excellent separability of the desired compound, the distillation temperature (column top temperature) is preferably not lower than 50° C. From the viewpoint of suppression of decomposition or quality maintenance of the desired compound, the distillation temperature is preferably not higher than 150° C. From these viewpoints, the distillation temperature is preferably not lower than 50° C. and not higher than 150° C., and more preferably not lower than 70° C. and not higher than 120° C.

The pressure during the distillation is preferably not less than 0.01 kPa in terms of absolute pressure because a desired compound of high purity can be efficiently recovered. The pressure during the distillation is preferably not more than 5 kPa in terms of absolute pressure because decomposition or alteration of the silyl phosphine compound can be suppressed and the silyl phosphine compound is easily obtained with high purity in high yield. From these reasons, the pressure during the distillation is preferably not less than 0.01 kPa and not more than 5 kPa, and more preferably not less than 0.1 kPa and not more than 4 kPa. The distillation is preferably carried out in an inert atmosphere.

In a first fraction, the solvent, the basic compound, the silylating agent, a slight amount of a decomposition product of each component, etc. are contained, and therefore, by removing them, the purity can be enhanced.

After the third step, the amount of the silyl phosphine compound in the distillation residue after vaporization of the silyl phosphine compound is preferably not less than 90 mass %, and more preferably not less than 95 mass %, in terms of a decrease ratio to the amount of the silyl phosphine compound in the solution containing a silyl phosphine compound at the beginning of the third step. This amount can be measured by $^{31}$P-NMR.

In this step, a compound represented by the following general formula (7) can be removed. The compound represented by the formula (7) is a by-product of the reaction of the silylating agent with phosphine, and by the distillation in the third step, this compound is removed as a high-boiling component.

[Formula 11]

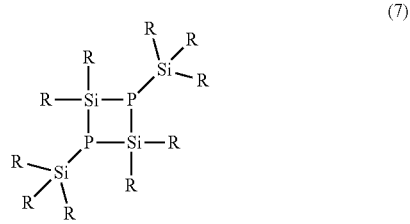

(7)

wherein R is the same as in the general formula (1).

Through the above third step, the desired silyl phosphine compound is obtained. The resulting silyl phosphine compound is in the form of a solid such as a powder, and is stored in the form of a liquid or a solid in an environment where contact with oxygen, water and the like is eliminated as much as possible, or is stored in the form of a dispersion of the compound in an appropriate solvent. In dispersions, solutions are included.

The solvent for dispersing the silyl phosphine compound is an organic solvent, and it is preferable that the solvent be particularly a non-polar solvent because inclusion of water is inhibited to prevent decomposition of the silyl phosphine compound. Examples of the non-polar solvents include saturated aliphatic hydrocarbons, unsaturated aliphatic hydrocarbons, aromatic hydrocarbon compounds, and trialkylphosphines. Examples of the saturated aliphatic hydrocarbons include n-hexane, n-heptane, n-octane, n-nonane, n-decane, n-dodecane, n-hexadecane and n-octadecane. Examples of the unsaturated aliphatic hydrocarbons include 1-undecene, 1-dodecene, 1-hexadecene and 1-octadecene. Examples of the aromatic hydrocarbons include benzene, toluene, xylene and styrene. Examples of the trialkylphosphines include triethylphosphine, tributylphosphine, tridecylphosphine, trihexylphosphine, trioctylphosphine, tridodecylphosphine and tridodecylphosphine. The boiling point of the organic solvent for dispersing the silyl phosphine compound is preferably high because handling of the silyl phosphine compound having spontaneous ignition properties, such as storage and transportation, can be safely carried out. The boiling point of the organic solvent is preferably not lower than 50° C., and more preferably not lower than 60° C. The upper limit of the boiling point of the organic solvent is preferably not higher than 270° C. (absolute pressure 0.1 kpa) from the viewpoint of influence on the properties of organic synthetic products and quantum dots produced using this as a raw material.

It is preferable to sufficiently dehydrate the solvent before the silyl phosphine compound is dispersed because decomposition of the silyl phosphine compound due to the reaction with water and formation of impurities due to the decomposition are prevented. The water content in the solvent is preferably not more than 20 ppm by mass, and more preferably not more than 10 ppm by mass. The water content can be measured by the method described in the Examples described later.

In order to prepare such conditions, for example, the solvent is deaerated and dehydrated while being heated under reduced pressure or vacuum conditions, thereafter the solvent is mixed with a silyl phosphine compound in a nitrogen gas atmosphere, and the mixture is poured into an airtight container.

Through these treatments, a dispersion of a silyl phosphine compound having been sufficiently decreased in the amount of impurities can be easily obtained.

In the dispersion of a silyl phosphine compound, the ratio of the silyl phosphine compound is preferably not less than 3 mass % and not more than 50 mass %, and more preferably not less than 8 mass % and not more than 30 mass.

Next, the silyl phosphine compound of the present invention is described.

In the silyl phosphine compound of the present invention, the amount of the compound represented by the general formula (2) that is an impurity having been conventionally considered to be difficult to remove is extremely small. Specifically, the content of the compound represented by the general formula (2) in the silyl phosphine compound of the present invention is not more than 0.5 mol %, and is preferably not more than 0.3 mol %. In the silyl phosphine compound of the present invention, the amount of the impurity that is difficult to remove by a conventional production process has been decreased, and therefore, an evil influence that the properties of organic synthetic products or quantum dots produced using this as a raw material are impaired or the properties of the resulting products are impaired can be effectively prevented. In order to reduce the amount of the compound represented by the general formula (2) to not more than the upper limit, the compound represented by the general formula (1) only needs to be produced by the aforesaid production process of the present invention, or the quantitative ratio between the silylating agent and phosphine only needs to be controlled. The content of the compound represented by the general formula (2) is a ratio to the compound represented by the general formula (1). The contents of the compound represented by the general formula (1) and the compound represented by the general formula (2) can be measured by, for example, the method described in the Examples described later using the analysis based on $^{31}$P-NMR.

Furthermore, it is preferable that as a raw material of quantum dots or chemical synthesis, the silyl phosphine compound of the present invention also contains extremely small amounts of other impurities that have been conventionally considered to be difficult to remove.

Specifically, the content of the compound represented by the general formula (3) is preferably not more than 0.1 mol %, more preferably not more than 0.08 mol %, and particularly preferably not more than 0.05 mol %. In this case, since in the silyl phosphine compound of the present invention, the amount of the impurity having been conventionally difficult to remove has been reduced, the above-described evil influence can be more effectively prevented. In order to reduce the amount of the compound represented by the general formula (3) to not more than the upper limit, the compound represented by the general formula (1) only needs to be produced by the aforesaid production process of the present invention, or the quantitative ratio between the silylating agent and phosphine only needs to be controlled. The content of the compound represented by the general formula (3) is a ratio to the compound represented by the general formula (1). The content of the compound represented by the general formula (3) can be measured by, for example, the method described in the Examples described later using the analysis based on $^{31}$P-NMR.

In the silyl phosphine compound of the present invention, the content of the silyl ether compound represented by the general formula (4) is preferably not more than 0.50 mol %, more preferably not more than 0.30 mol %, and still more preferably not more than 0.15 mol %. By reducing the amount of the impurity having been conventionally difficult to remove, as described above, the aforesaid evil influence can be more effectively prevented. The content of the compound represented by the general formula (4) is a ratio to the compound represented by the general formula (1). In order to reduce the amount of the compound represented by the general formula (4) to not more than the upper limit, the compound represented by the general formula (1) only needs to be produced by the aforesaid production process of the present invention. The content of the compound represented by the general formula (4) can be measured by, for example, the method described in the Examples described later using the analysis based on gas chromatography.

In the silyl phosphine compound of the present invention, the content of the compound represented by the general formula (5) is preferably not more than 0.30 mol %, more preferably not more than 0.15 mol %, and particularly preferably not more than 0.05 mol %. The content of the compound represented by the general formula (5) is a ratio to the compound represented by the general formula (1). In order to reduce the amount of the compound represented by the general formula (5) to not more than the upper limit, the first step to the third step in the production of the compound represented by the general formula (1) by the aforesaid production process of the present invention only need to be carried out in an inert atmosphere. The content of the compound represented by the general formula (5) can be measured by, for example, the method described in the Examples described later using the analysis based on $^{31}$P-NMR.

In the silyl phosphine compound of the present invention, the content of the compound represented by the general formula (6) is preferably not more than 0.30 mol %, more preferably not more than 0.15 mol %, and particularly preferably not more than 0.05 mol %. In order to reduce the amount of the compound represented by the general formula (6) to not more than the upper limit, the first step to the third step in the production of the compound represented by the general formula (1) by the aforesaid production process of the present invention only need to be carried out in an inert atmosphere. The content of the compound represented by the general formula (6) is a ratio to the compound represented by the general formula (1). The content of the compound represented by the general formula (6) can be measured by, for example, the method described in the Examples described later using the analysis based on $^{31}$P-NMR.

In the silyl phosphine compound of the present invention, the content of the compound represented by the general formula (7) is preferably not more than 1.0 mol %, more preferably not more than 0.5 mol %, and particularly preferably not more than 0.2 mol %. In order to reduce the amount of the compound represented by the general formula (7) to not more than the upper limit, a high-boiling component only needs to be separated in the aforesaid production process of the present invention. The content of the compound represented by the general formula (7) is a ratio to the compound represented by the general formula (1). The content of the compound represented by the general formula (7) can be measured by, for example, the method described in the Examples described later using the analysis based on $^{31}$P-NMR.

In the silyl phosphine compound of the present invention, the content of the compound represented by the general formula (1) is preferably not less than 99.0 mol %, more preferably not less than 99.3 mol %, and particularly preferably not less than 99.5 mol %. The amount of the compound represented by the general formula (1) can be measured by, for example, the method described in the Examples described later using the analysis based on $^{31}$P-NMR.

The above-described preferred ratios of the compounds represented by the formulas (2) to (7) to the compound represented by the formula (1) are applicable also to the case where the silyl phosphine compound is present in the form of a solid such as a powder and also to the case where the silyl phosphine compound is present in the state of being dispersed in a solvent. That is to say, in the former case, the above-described preferred mole ratios of the compounds represented by the formulas (2) to (7) mean mole ratios of the compounds represented by the formulas (2) to (7) to the compound of the formula (1) in a solid such as a powder composed of the silyl phosphine compound. In the latter case, the above-described preferred mole ratios mean mole ratios of the compounds represented by the formulas (2) to (7) to the compound of the formula (1) in a dispersion in which the silyl phosphine compound is dispersed.

As described above, the silyl phosphine compound obtained by the production process of the present invention and the silyl phosphine compound of the present invention are inhibited from inclusion of impurities as much as possible and prevented from being colored and decomposed. Owing to this, when the silyl phosphine compound is used as a raw material for organic synthesis (e.g., production of phosphinine or the like) or for producing indium phosphide, evil influences, such as inhibition of production reaction, decrease in yield and lowering of properties of the resulting organic compound or indium phosphide, can be effectively prevented.

EXAMPLES

The present invention is described below in more detail with reference to Examples, but the present invention is not limited to those Examples.

Example 1

A reaction vessel was charged with 189.8 kg of toluene (water content by mass: not more than 20 ppm) having been deaerated and dehydrated, and then charged with 82 kg of triethylamine and 149.5 kg of trimethylsilyl trifluoromethanesulfonate, and the reaction vessel was purged with nitrogen, followed by adjusting the liquid temperature to 30° C.

The reaction vessel was charged with 7.4 kg of phosphine gas over a period of 3 hours, and the liquid temperature was adjusted to 35° C., followed by carrying out aging for 4 hours.

The resulting reaction solution of 424.9 kg had separated into two layers, and after they were allowed to stand still for 12 hours in order to use the upper layer, the lower layer was separated. In order to remove a low-boiling component, the upper layer was concentrated by a concentration can under reduced pressure until the final pressure became 6.3 KPa in terms of absolute pressure and the liquid temperature became 70° C., thereby obtaining 60.1 kg of a concentrated solution. In the solution containing a silyl phosphine compound after the second step, the amount of the silyl phosphine compound was 3.2 mass % in terms of a decrease ratio to the amount of the silyl phosphine compound in the solution at the beginning of the second step.

The resulting concentrated solution was distilled at a column top temperature of 85° C. under reduced pressure of 0.5 KPa, then a first fraction was removed, and thereafter, 49.3 kg of a main fraction was recovered, thereby obtaining a recovered substance. After the third step, the amount of the silyl phosphine compound in the distillation residue after vaporization of the silyl phosphine compound was 93 mass % in terms of a decrease ratio to the amount of the silyl phosphine compound in the solution containing a silyl phosphine compound at the beginning of the third step.

By the analysis based on $^{31}$P-NMR under the following conditions, the recovered substance (liquid) was confirmed to be tris(trimethylsilyl)phosphine (TMSP), and its purity and yield were measured. The results are set forth in Table 1 described below. Furthermore, a spectrum obtained by the analysis based on $^{31}$P-NMR is shown in FIG. 1. In FIG. 1, a peak of TMSP that was a desired product was observed at δ-251.225 ppm. In FIG. 1, peaks of the compounds represented by the formulas (2) to (7) were not observed, but in the analysis based on $^{31}$P-NMR under the above conditions, usually, the peak position of the compound represented by the formula (2) (R is methyl) is δ-237.4 (d, J=186 Hz) ppm, the peak position of the compound represented by the formula (3) (R is methyl) is δ-239±2.0 (q, J=180 Hz), the peak position of the compound represented by the formula (5) (R is methyl) is 115.1 ppm, the peak position of the compound represented by the formula (6) (R is methyl) is 24.2 ppm, and the peak position of the compound represented by the formula (7) (R is methyl) is -244.1 ppm.

On the basis of the above spectrum, the contents of the compounds represented by the formulas (2), (3), (5), (6) and (7) (in each, R is methyl) in the tris(trimethylsilyl)phosphine were measured by the analysis based on $^{31}$P-NMR. The results are set forth in Table 2 described below.

In addition, the content of the compound represented by the formula (4) (R is methyl) in the tris(trimethylsilyl) phosphine was measured by gas chromatography analysis. The result is set forth in Table 2 described below. A spectrum obtained by the gas chromatography analysis is shown in FIG. 2. In FIG. 2, a peak of a peak number 1 is derived from the compound represented by the formula (4).

Measurement Conditions for $^{31}$P-NMR:

A sample to be measured was dissolved in deuterated benzene in such a manner that the concentration became 20 mass %. The resulting solution was measured by JNM-ECA500 manufactured by JEOL Ltd. under the following conditions. Observation frequency: 202.4 MHz, pulse: 45 degrees, capture time: 5 seconds, cumulative number of times: 256 times, measuring temperature: 22° C., standard substance: 85 mass % phosphoric acid Measurement Conditions for Gas Chromatography:

A measurement sample was subdivided into containers with septum caps in an inert gas atmosphere, and 0.2 μL of the measurement sample was injected into a gas chromatography (manufactured by Shimadzu Corporation, "GC-2010") by a syringe, followed by measurement under the following conditions.

Column: manufactured by Agilent J&W, "DB1" (inner diameter 0.25 mm, length 30 m), injection temperature: 250° C., detector temperature: 300° C.

Detector: FID, carrier gas: He (100 kPa pressure)

Split ratio: 1:100

Temperature rise conditions: maintenance of 50° C.×3 minutes→heating up to 200° C. at heating rate of 10° C./min→heating up to 300° C. at heating rate of 50° C./min→maintenance of 300° C.×10 minutes

Example 2

A reaction vessel was charged with 144.1 g of n-hexane (water content by mass: not more than 10 ppm) having been deaerated and dehydrated, and then charged with 82 g of triethylamine and 149.5 g of trimethylsilyl trifluoromethanesulfonate, and the reaction vessel was purged with nitrogen, followed by adjusting the liquid temperature to 30° C.

The reaction vessel was charged with 7.4 g of phosphine gas over a period of 3 hours, and the liquid temperature was adjusted to 35° C., followed by carrying out aging for 4 hours.

The resulting reaction solution of 380 g had separated into two layers, and after they were allowed to stand still for 12 hours in order to use the upper layer, the lower layer was separated. In order to remove a low-boiling component, the upper layer was concentrated by a concentration can under reduced pressure until the final pressure became 2.2 KPa and the liquid temperature became 70° C., thereby obtaining 58.4 g of a concentrated solution.

The resulting concentrated solution was distilled at a column top temperature of 85° C. under reduced pressure of 0.5 KPa, and a first fraction was removed, followed by recovering 49.4 g of a main fraction.

By the analysis based on $^{31}$P-NMR under the above conditions, the recovered substance (liquid) was confirmed to be tris(trimethylsilyl)phosphine, and its purity and yield were measured. The results are set forth in Table 1.

In addition, the contents of the compounds of the formulas (2) to (7) were measured in the same manner as in Example 1. The results are set forth in Table 2.

Comparative Example 1 described below is a Comparative Example in which except for changing the solvent to the same diethyl ether as in Non Patent Literature 1, the same operations as in Example 2 were carried out.

Comparative Example 1

A reaction vessel was charged with 156.9 g of diethyl ether (water content by mass: not more than 10 ppm) having been deaerated and dehydrated, and then charged with 82 g of triethylamine and 149.5 g of trimethylsilyl trifluoromethanesulfonate, and the reaction vessel was purged with nitrogen, followed by adjusting the liquid temperature to 30° C.

The reaction vessel was charged with 7.4 g of phosphine gas over a period of 3 hours, and the liquid temperature was adjusted to 35° C., followed by carrying out aging for 4 hours.

The resulting reaction solution of 424.9 g had separated into two layers, and after they were allowed to stand still for 12 hours in order to use the upper layer, the lower layer was separated. In order to remove a low-boiling component, the upper layer was concentrated by a concentration can under reduced pressure until the final pressure became 2.2 KPa and the liquid temperature became 70° C., thereby obtaining 59.1 g of a concentrated solution.

The resulting concentrated solution was distilled at a column top temperature of 85° C. under reduced pressure of 0.5 KPa, and a first fraction was removed, followed by recovering 49.4 g of a main fraction.

By the analysis based on $^{31}$P-NMR under the above conditions, purity and yield of tris(trimethylsilyl)phosphine in the recovered substance were measured. The results are set forth in Table 1. In addition, the contents of the compounds of the formulas (2) to (7) were measured in the same manner as in Example 1. The results are set forth in Table 2.

Comparative Example 2 described below is a Comparative Example in which except for changing the solvent to cyclopentyl methyl ether, the same operations as in Example 2 were carried out.

Comparative Example 2

A reaction vessel was charged with 2150 g of cyclopentyl methyl ether (water content by mass: not more than 10 ppm) having been deaerated and dehydrated, and then charged with 121.4 g of triethylamine and 280 g of trimethylsilyl trifluoromethanesulfonate, and the reaction vessel was purged with nitrogen, followed by adjusting the liquid temperature to 30° C.

The reaction vessel was charged with 14.4 g of phosphine gas over a period of 15 minutes, and the liquid temperature was adjusted to 35° C., followed by carrying out aging for 4 hours.

The resulting reaction solution of 2480.66 g had separated into two layers, and after they were allowed to stand still for 12 hours in order to use the upper layer, the lower layer was separated. In order to remove a low-boiling component, the upper layer was concentrated by a concentration can until the final pressure became 2.2 KPa and the liquid temperature became 70° C., thereby obtaining 110 g of a concentrated solution.

The resulting concentrated solution was distilled at a column top temperature of 85° C. under reduced pressure of 0.5 KPa, and a first fraction was removed, followed by recovering 97.3 g of a main fraction.

By the analysis based on $^{31}$P-NMR under the above conditions, purity and yield of tris(trimethylsilyl)phosphine in the recovered substance were measured. The results are set forth in Table 1. In addition, the contents of the compounds of the formulas (2) to (7) were measured in the same manner as in Example 1. The results are set forth in Table 2.

TABLE 1

| | Solvent | | | |
|---|---|---|---|---|
| | Type | Relative dielectric constant | Purity (mol %) | Yield (mass %) |
| Ex. 1 | toluene | 2.4 | 99.6 | 90 |
| Ex. 2 | n-hexane | 1.9 | 99.3 | 90 |
| Comp. Ex. 1 | diethyl ether | 4.3 | 98.3 | 90 |
| Comp. Ex. 2 | cyclopentyl methyl ether | 4.8 | 98.1 | 90 |

TABLE 2

| | Compound represented by general formula (2) (mol %) | Compound represented by general formula (3) (mol %) | Compound represented by general formula (4) (mol %) | Compound represented by general formula (5) (mol %) | Compound represented by general formula (6) (mol %) | Compound represented by general formula (7) (mol %) |
|---|---|---|---|---|---|---|
| Ex. 1 | 0.15 | N.D. | 0.08 | N.D. | N.D. | 0.10 |
| Ex. 2 | 0.20 | N.D. | 0.10 | 0.05 | 0.05 | 0.21 |
| Comp. Ex. 1 | 0.35 | N.D. | 0.18 | 0.10 | 0.1 | 0.26 |
| Comp. Ex. 2 | 0.55 | N.D. | 0.28 | 0.10 | 0.2 | 0.40 |

N.D. . . . not more than detection limit (detection limit: less than 0.05 mol %)

As shown in Table 1 and Table 2, in Examples 1 and 2, a silyl phosphine compound was obtained with a high purity of not less than 99% and in a high yield of not less than 90%. On the other hand, in Comparative Examples 1 and 2, it was indicated that a yield of the same level as in Examples 1 and 2 was obtained but the purity was inferior.

In Examples 1 and 2, it was indicated that the amounts of the compounds represented by the formulas (2) to (7) that were impurities were extremely slight and significantly smaller than the amounts in Comparative Examples 1 and 2.

Example 3

As an organic solvent, 1-octadecene (water content by mass: 5.4 ppm) having been deaerated and dehydrated by heating under the vacuum conditions was used. In a closed space, 89.2 parts by mass of this organic solvent and 10.8 parts by mass of the silyl phosphine compound obtained in Example 1 were mixed in a nitrogen atmosphere to obtain a silyl phosphine compound solution. A sealed container was charged with this solution as it was, and after the lapse of 12 hours, the amounts of the compounds of the formulas (2) to (7) in the resulting solution were measured by the following method. The results are set forth in Table 3. The water content was measured using a Karl Fischer Moisture Titrator (MKC-610 manufactured by Kyoto Electronics Manufacturing Co., Ltd.).

Water Content Measuring Method:

In measuring cells, reagents used: Aquamicron AS (generator electrolyte) and a counter electrolyte Aquamicron CXU (counter electrolyte) were placed, and then they were sufficiently stabilized. After the stabilization, 5 g of the solution was taken into a gas-tight syringe of not less than 5 ml having been purged with nitrogen, and introduced into the generator electrolyte, followed by measurement.

(Measuring Method for Amounts of Compounds of Formulas (2) to (7) in Solution)

The contents of the compounds represented by the aforesaid formulas (1), (2), (3), (5), (6) and (7) in the solution were measured by the analysis based on $^{31}$P-NMR. The measurement conditions for $^{31}$P-NMR were the same as the conditions for the analysis of the solution based on $^{31}$P-NMR, except that the sample was prepared in the following manner. The ratios of the compounds of the formulas (2), (3), (5), (6) and (7) (in each, R is methyl) to the compound represented by the formula (1) are set forth in Table 3 described below.

(Process for Preparing Measurement Sample for $^{31}$P-NMR)

In an inert gas atmosphere, 0.4 ml of the solution and 0.2 ml of deuterated benzene were mixed to prepare a sample tube.

In addition, the contents of the compounds represented by the formulas (1) and (4) (R is methyl) in the solution were measured by gas chromatography analysis. The measurement conditions for gas chromatography were the same as the conditions for the analysis of the TMSP solution based on gas chromatography, except that the preparation process for the sample and the injection amount of the sample were changed in the following manner. The ratio of the compound of the formula (4) to the compound represented by the formula (1) is set forth in Table 3 described below.

(Process for Preparing Measurement Sample for Gas Chromatography)

In an inert gas atmosphere, 10 mL of dehydrated grade hexane was mixed with 1 ml of a TMSP dilute solution to prepare a solution. Into the gas chromatography, 1.0 μL of the measurement sample was injected by a syringe, followed by measurement.

Example 4

As an organic solvent, trioctyl phosphine (water content by mass: not more than 5 ppm) having been deaerated and dehydrated by distillation was used. Instead of the silyl phosphine compound obtained in Example 1, the silyl phosphine compound obtained in Example 2 was used. A silyl phosphine compound solution was obtained in the same manner as in Example 3 except for these points. The ratios of the compounds of the formulas (2) to (7) to the compound of the formula (1) in the resulting solution were measured in the same manner as in Example 3, and the results are set forth in Table 3.

Reference Example 1

As an organic solvent, 1-octadecene (water content by mass: 40 ppm) not having been deaerated and dehydrated was used. A silyl phosphine compound solution was obtained in the same manner as in Example 3 except for this point. The ratios of the compounds of the formulas (2) to (7) to the compound of the formula (1) in the resulting solution were measured in the same manner as in Example 3, and the results are set forth in Table 3.

TABLE 3

|  | Compound represented by general formula (2) (mol %) | Compound represented by general formula (3) (mol %) | Compound represented by general formula (4) (mol %) | Compound represented by general formula (5) (mol %) | Compound represented by general formula (6) (mol %) | Compound represented by general formula (7) (mol %) |
| --- | --- | --- | --- | --- | --- | --- |
| Ex. 3 | 0.15 | N.D. | 0.08 | N.D. | N.D. | 0.10 |
| Ex. 4 | 0.20 | N.D. | 0.10 | 0.05 | 0.05 | 0.21 |
| Ref. Ex. 1 | 0.45 | N.D. | 0.32 | 0.21 | 0.25 | 0.10 |

As shown in Table 3, it was understood that by mixing a silyl phosphine compound with an organic solvent having been decreased in water content, the amounts of the compounds represented by the general formulas (2) to (7) were able to be maintained at a low level.

INDUSTRIAL APPLICABILITY

The process for producing a silyl phosphine compound of the present invention not only exhibits high safety but also can improve a reaction rate and can effectively suppress formation of impurities. On this account, in this production process, a silyl phosphine compound that is useful as a raw material of indium phosphide quantum dots or chemical synthesis can be produced by an industrially advantageous process. The silyl phosphine compound of the present invention is useful as a raw material of indium phosphide quantum dots or chemical synthesis.

The invention claimed is:

1. A process for producing a silyl phosphine compound, comprising:
    a first step of mixing a solvent, a basic compound, a silylating agent and phosphine to obtain a solution containing a silyl phosphine compound, wherein the solvent is one or two or more selected from pentane, n-hexane, n-heptane, n-octane, cyclohexane, benzene, toluene and p-xylene;
    a second step of removing the solvent from the solution containing a silyl phosphine compound to obtain a concentrated solution of a silyl phosphine compound; and
    a third step of distilling the concentrated solution of a silyl phosphine compound to obtain the silyl phosphine compound.

2. The process for producing a silyl phosphine compound according to claim 1, wherein the silylating agent is a compound represented by the following general formula (I), and the silyl phosphine compound is a compound represented by the following general formula (1):

[Formula 1]

wherein each R is independently an alkyl group having not less than 1 and not more than 5 carbon atoms or an aryl group having not less than 6 and not more than 10 carbon atoms, and X is at least one group selected from a fluorosulfonic acid group, a fluoroalkanesulfonic acid group and a perchloric acid group,

[Formula 2]

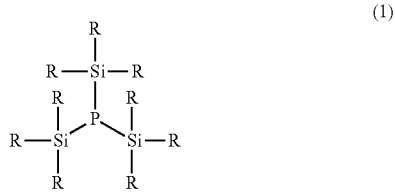

wherein R is the same as in the general formula (I).

3. The process for producing a silyl phosphine compound according to claim 1, wherein the basic compound is one or two or more selected from methylamine, diethylamine, trimethylamine, ethylamine, dimethylamine, triethylamine, ethylenediamine, aniline, toluidine, pyridine and piperidine.

4. The process for producing a silyl phosphine compound according to claim 1, wherein the silylating agent is one or two or more selected from trimethylsilyl trifluoromethanesulfonate, triethyl silyl trifluoromethanesulfonate, tributyl silyl trifluoromethanesulfonate, triisopropyl silyl trifluoromethanesulfonate and triphenyl silyl trifluoromethanesulfonate.

5. The process for producing a silyl phosphine compound according to claim 1, wherein the basic compound in an amount not less than 3 times and not more than 6 times the molar amount of phosphine is mixed with phosphine in the first step.

6. The process for producing a silyl phosphine compound according to claim 1, wherein the silylating agent in an amount not less than 3 times and not more than 6 times the molar amount of phosphine is mixed with phosphine in the first step.

7. The process for producing a silyl phosphine compound according to claim 1, wherein the silyl phosphine compound is tris(trimethylsilyl)phosphine.

8. The process for producing a silyl phosphine compound according to claim 1, wherein the first step is carried out in an inert atmosphere.

9. The process for producing a silyl phosphine compound according to claim 1, wherein the silyl phosphine compound obtained in the third step is mixed with an organic solvent having been dehydrated, to obtain a silyl phosphine compound in a state of being dispersed in the organic solvent.

* * * * *